(12) United States Patent
Roy-Faderman

(10) Patent No.: US 9,977,814 B2
(45) Date of Patent: May 22, 2018

(54) CUSTOM METADATA IN LOOSELY COUPLED TRIGGERS

(71) Applicant: salesforce.com, inc., San Francisco, CA (US)

(72) Inventor: Avrom Irwin Roy-Faderman, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 362 days.

(21) Appl. No.: 14/722,825

(22) Filed: May 27, 2015

(65) Prior Publication Data

US 2015/0317350 A1 Nov. 5, 2015

Related U.S. Application Data

(63) Continuation-in-part of application No. 13/289,116, filed on Nov. 4, 2011, now Pat. No. 9,690,808.

(60) Provisional application No. 62/060,673, filed on Oct. 7, 2014.

(51) Int. Cl.
*G06F 17/30* (2006.01)

(52) U.S. Cl.
CPC .... *G06F 17/30371* (2013.01); *G06F 17/3051* (2013.01); *G06F 17/30289* (2013.01); *G06F 17/30342* (2013.01); *G06F 17/30595* (2013.01); *G06F 17/30876* (2013.01); *G06F 17/30067* (2013.01)

(58) Field of Classification Search
CPC ........... G06F 17/3051; G06F 17/30067; G06F 17/30289; G06F 17/30595; G06F 17/30342

USPC ....... 707/702, 609, 760, 770, 694, 713, 756, 707/784

See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

U.S. Appl. No. 13/998,890.
U.S. Appl. No. 13/986,251, filed Apr. 16, 2013.

*Primary Examiner* — Dangelino N Gortayo
(74) *Attorney, Agent, or Firm* — Dergosits & Noah LLP; Todd A. Noah

(57) ABSTRACT

A database system that supports associating a custom metadata type with loosely coupled triggers may be implemented to include instructions to receive a definition of a custom metadata type, the definition comprising at least one relationship field associated with a triggerable database object. The database system may also include instructions to associate the definition of the custom metadata type with a loosely-coupled trigger, and to cause the loosely-coupled trigger to execute based on generating a custom metadata record of the custom metadata type. The custom metadata record including a triggerable database object value for the relationship field.

20 Claims, 18 Drawing Sheets

(56) References Cited

U.S. PATENT DOCUMENTS

| | | | |
|---|---|---|---|
| 5,926,819 A * | 7/1999 | Doo | G06F 17/3051 707/999.002 |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,212 B1 * | 6/2002 | Samu | G06F 21/6227 707/999.009 |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,631,296 B2 * | 12/2009 | Seshadri | G06N 5/046 715/744 |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,112,413 B2 * | 2/2012 | Krishna | G06F 17/30997 707/713 |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,793,706 B2 * | 7/2014 | Villadsen | G06F 9/542 719/318 |
| 9,417,931 B2 * | 8/2016 | Krishnaswamy | G06F 9/541 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0063415 A1 | 3/2009 | Chatfield et al. | |
| 2009/0100342 A1 | 4/2009 | Rueben et al. | |
| 2009/0177744 A1 | 7/2009 | Marlow et al. | |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |

\* cited by examiner

FIG. 6A

Triggers

| Name | Namespace | Version | Entity Type |
|---|---|---|---|
| demoTrigger | | 25 | Any |
| T1 | | 13 | Entity 1 |
| | | | |
| | | | |
| | | | |

FIG. 6B

Triggers

| Name | Namespace | Version | Entity Type |
|---|---|---|---|
| demoTrigger | | 25 | Any | demoTrigger is bound to:

Entity 12    Entity 13

US 9,977,814 B2

CUSTOM METADATA IN LOOSELY COUPLED TRIGGERS

CLAIM OF PRIORITY

This application claims the benefit of U.S. Provisional Patent Application No. 62/060,673, filed Oct. 7, 2014 and is a continuation-in-part application of U.S. application Ser. No. 13/289,116, filed Nov. 4, 2011, each of which is incorporated in its entirety herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to methods and systems for custom metadata in loosely coupled triggers in a computing environment, and more specifically to enable third-party developers to use custom metadata in loosely coupled triggers.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Organizations can run and customize existing database application programming interfaces (APIs) or build new custom database APIs based on particular business needs. Database triggers can be present within the APIs that are procedural codes that are executed in response to user interactions with a database. For example, a trigger can be a code that is executed before or after various types of database operations are executed such as: insert, update, delete, merge, undelete, etc. A trigger can be used to perform a number of automatic actions, such as cascading changes through related tables, enforcing column restrictions, comparing the results of data modifications, and maintaining the referential integrity of data across a database. The standard trigger procedure is to activate a trigger function in an API or provide a trigger code that is directed towards a specific entity.

Conventional "tightly-coupled triggers" require that specific entities (e.g., database object or table) be defined and applied to the trigger at the time the database is created and before the trigger program is compiled. These tightly-coupled triggers are inefficient for situations where the entity is not defined at the time the trigger code is developed. Metadata has been typically used to describe data, such as a format of the data, a type of the data, etc. Metadata can include information about various aspects of the data that it describes, including its structure, content, quality, context, origin, ownership and condition. However, techniques for defining metadata have generally exhibited various limitations. For example, the metadata itself has typically been incapable of being described by other metadata in a standard manner made available to third party developers of a platform maintaining the metadata.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 6A to 6B illustrate an example of a user interface with listings of loose and tight triggers and coupled entities, in accordance with some embodiments.

DETAILED DESCRIPTION

Figure 1:
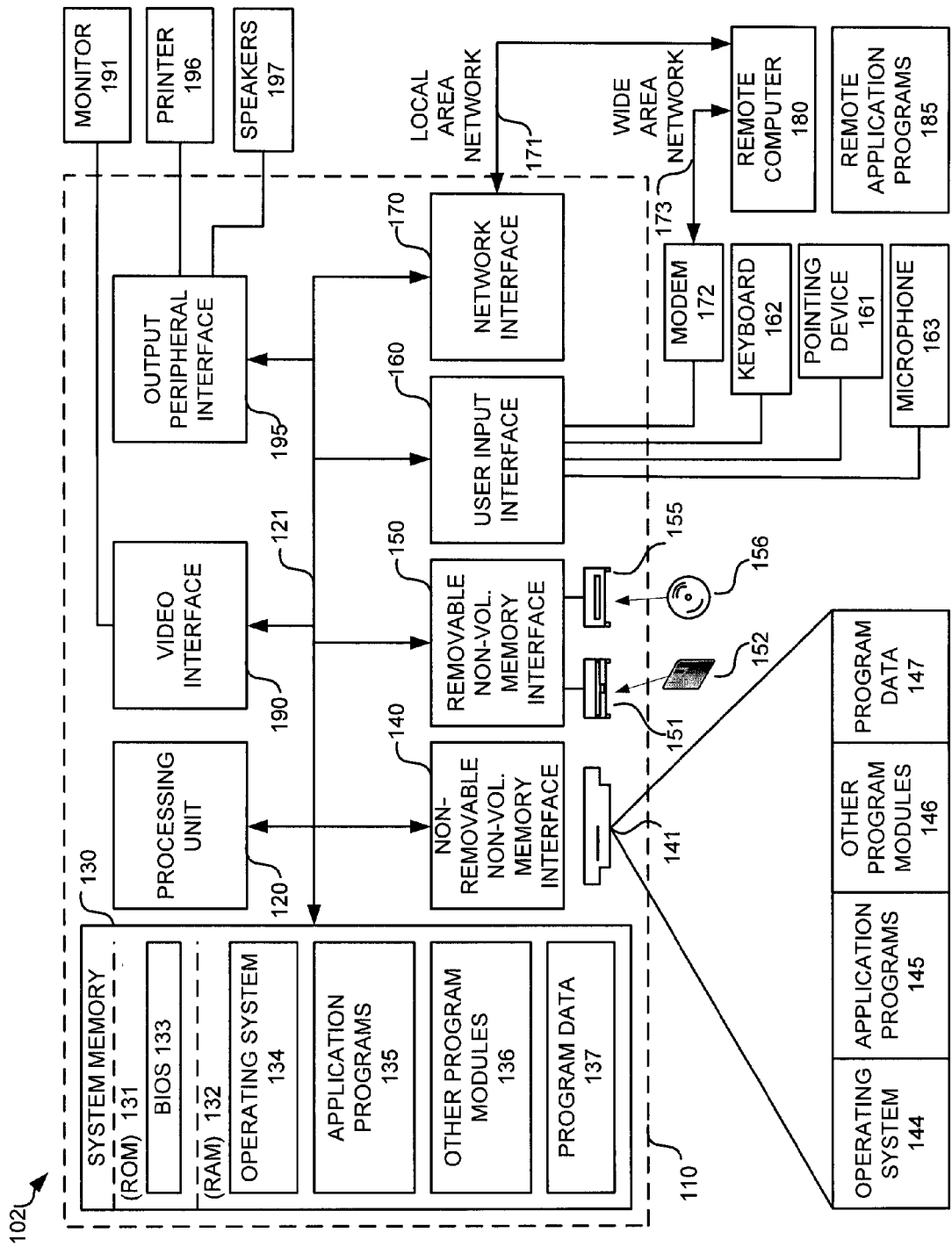
FIG. 1 shows a diagram of an example computing system that may be used with some embodiments.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers. As use herein, the term "custom metadata type" refers to a definition of a format for custom metadata, and the term "custom metadata record" refers to a particular record of that custom metadata type/format. A custom metadata record may include one or more fields. One or more of the fields may be a relationship field associating the custom metadata record with a triggerable database object. The distinction between the "custom metadata type" and the "custom metadata record" may be analogous to the distinction between a table and records of the table, except with the "custom metadata type" the records are themselves metadata.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include a method associating a custom metadata type with loosely coupled triggers. The custom metadata type may be implemented as a table having records that are metadata (also referred to as custom metadata records). The existence of a custom metadata record may control the behavior of the loosely coupled trigger at runtime. The method comprises receiving, by a database system, a definition of custom metadata type comprising a relationship field with triggerable database object types as the domain of the relationship field. The metadata type may include other fields that the trigger code may use to configure its behavior. The definition of the custom metadata type is linked to a loosely coupled trigger before the loosely coupled trigger is compiled. A custom metadata record of the custom metadata type with a particular value (e.g., triggerable database object "account") for the relationship field can be created after the trigger is compiled. The creation of the custom metadata record has the effect of coupling the loosely coupled trigger to the referenced triggerable database object (e.g., account object). When a custom metadata record refers to a particular triggerable database object, and when one or more records of the triggerable database object is updated (e.g., by inserting new record, by modifying an existing record, or by deleting an existing record) by a database application, the trigger executes (e.g., before a record is inserted, or after a record is deleted). During execution, the trigger has access to the record or records in the triggerable database object currently being processed by the database application and the custom metadata record or records that reference the triggerable database object.

The disclosed embodiments may include an apparatus for associating a custom metadata type with loosely coupled triggers. The apparatus comprises a processor, and one or more stored sequences of instructions which, when executed by the processor, cause the processor to carry out the steps of receiving, by a database system, a definition of a custom metadata type comprising at least a relationship field with triggerable database object types as the domain of the relationship field. The definition of the custom metadata type is linked to a loosely coupled trigger before the loosely coupled trigger is compiled. A custom metadata record of the custom metadata type with a particular triggerable database object value for the relationship field can be created after the loosely coupled trigger is compiled, causing the loosely coupled trigger to couple to the referenced triggerable database object in the relationship field. When a custom metadata record refers to a particular triggerable database object, and when one or more records of the triggerable database object is updated by a database application, the trigger executes (e.g., before a record is inserted into, or after a record is deleted from the triggerable database object).

The disclosed embodiments may include a machine-readable medium carrying one or more sequences of instructions for associating custom metadata type with loosely coupled triggers, which instructions, when executed by one or more processors, cause the one or more processors to carry out the steps of receiving, by a database system, a definition of custom metadata type comprising a relationship field with a triggerable database object as a domain. The definition of the custom metadata type is linked to a loosely coupled trigger before the loosely coupled trigger is compiled. A custom metadata record of the custom metadata type with a particular triggerable database object value for the relationship field can be created after the trigger is compiled. The creation of the custom metadata record causes coupling of the loosely coupled trigger to the referenced triggerable database object. When a custom metadata record refers to a particular triggerable database object, and when one or more records of the triggerable database object is updated by a database application, the trigger executes.

The disclosed embodiments may be related to a database system that supports associating a custom metadata type with loosely coupled triggers. The database system may be implemented such that given a custom metadata definition containing at least one relationship field with triggerable database objects as its domain, a custom metadata record can be created after the loosely coupled trigger is compiled. The definition of the custom metadata type is linked to a loosely coupled trigger before the loosely coupled trigger is compiled. When the custom metadata record is created with a particular value for the triggerable database object, the loosely coupled trigger may execute when the database system updates the triggerable database object. Optionally, the database system can limit the number of specified relationship fields to any number. The custom metadata record may already exist at trigger execution time. Whenever the loosely coupled trigger executes on a triggerable database object, the database system loads the custom metadata record related to the triggerable database object via any of the specified fields available in the trigger context. For some embodiments, the loosely coupled trigger may simply execute using an existing related custom metadata record.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In general, many database system software programs include prebuilt APIs that provide additional functionality. It is possible for system administrators and developers to create custom APIs to add custom functionality to database systems. The coding that is required to create the APIs can include database triggers. The database triggers are procedural codes in a programming language such as Apex script that can be automatically executed in response to certain detected events in a database. For example, the detected events may be related to adding a record, deleting a record, or updating a record in a certain database table. The connection between the triggers and their corresponding entities can be predefined by the programmer of the API. This type of predefined coupling between the trigger and the database entity or entities can be known as a "tightly-coupled trigger" or a "tightly-coupled trigger." The tightly-coupled triggers do not allow database users to selectively couple one or more entities (or tables) to the triggers after the trigger code has been compiled. The programmer may define a tightly-coupled trigger by selecting an entity to be coupled to the tightly-coupled trigger and writing the computer code defining the processing performed by the trigger.

In contrast to tightly-coupled triggers, "loosely-coupled triggers" are triggers that are not coupled to one or more predetermined specific entities at the time the loosely-coupled trigger code is compiled. A user of an API may select or deselect the entity or entities that are to be coupled to a loosely-coupled trigger through a user interface. The program can also validate the selected and deselected entities to be coupled with the loosely-coupled trigger. If errors are detected, the program can issue an error message and correct the erroneous entity couplings. The loosely-coupled trigger code does not have to be recompiled after the entity or entities are coupled to the trigger by the user through the user interface.

Some embodiments of the present invention are directed towards loosely-coupled triggers that can include trigger coding for the processes to be executed but may not define some or all of the entities coupled with the trigger. For some embodiments, the loosely-coupled triggers can be configured to be coupled to one or more entities that are selected by a user after the trigger code has been compiled. The trigger code for a loosely-coupled trigger can be written to provide a trigger function but the trigger function may not be applied to any specific entity or entities at the time the trigger code is compiled.

For some embodiments, the trigger code can be written and each of the loosely-coupled triggers may be optionally coupled to a predetermined set of entities. One or more of the entities in the predetermined set can be coupled to the trigger by the user through a user interface after the trigger code has been compiled. However, the user may not be able to couple entities that are not part of the predetermined set of entities to the loosely-coupled trigger. For some embodiments, the trigger code may require one or more predetermined entities to be coupled to the loosely-coupled trigger. The user may be required to have these predetermined entities coupled to the loosely-coupled trigger, but the user may also have the option of coupling additional entities to the loosely-coupled trigger.

After the database application with loosely-coupled triggers has been written and tested, the database application program can be provided to users. In an embodiment, the program can include a graphical user interface that may include a listing of loosely-coupled triggers. Through the user interface, the user can select the loosely-coupled triggers and one or more entities that are to be coupled to each of the loosely-coupled triggers. Once the triggers are properly coupled to the entities, the program may include a validation process that checks the validity of the coupling of the loosely-coupled trigger to each of the selected entities. If a selected entity is valid, the program can couple the selected entity and loosely-coupled trigger. If the selected entity is invalid, the program may issue an error message and decouple the entity from the loosely-coupled trigger.

For some embodiments, the user may also deselect entities to be decoupled from the loosely-coupled triggers and the program may include a validation process that checks the validity of the decoupling of the selected entities from the loosely-coupled triggers. If an unselected entity is valid, the program can decouple the selected entity from the loosely-coupled trigger. If the deselected entity is invalid, the program may issue an error message and maintain the coupling of the entity to the loosely-coupled trigger. The loosely-coupled triggers allow the definition of the trigger entities (e.g., database object) to be deferred until after the trigger code is compiled and subsequent compiling is not required. For some embodiments, the existence of one or more custom metadata records relating to a triggerable database object via a designated relationship field may act as the coupling itself. In other words, the generation of at least one custom metadata record (via a graphical user interface or via any other methods) may have the same coupling effect as having a separate process to couple the loosely coupled trigger to the triggerable database object.

Once the selected and unselected entities have been validated, the loosely-coupled triggers and coupled entities can be stored as metadata in a trigger metadata database. The database program can actuate the loosely-coupled triggers before or after the relevant commands are issued to the database. For example, a trigger can be executed before or after specific data manipulation language (DML) events occur, such as before object records are inserted into the database, or after records have been deleted.

The tightly or loosely-coupled trigger can be actuated by detection of the entity or entities that are coupled to the trigger. In different embodiments, the triggers can be written to execute the trigger function before or after the detection of certain types of operations such as: insert, update, delete, merge, upsert, undelete, etc. Triggers can be used to maintain the integrity of the information in a database. For example, when a new record (representing a new worker) is added to an employee table, a trigger can be actuated to create new records for the new employee in other tables for other employee related accounting such as: taxes, vacations, and salaries.

FIG. 1 is a diagram of an example computing system that may be used with some embodiments of the present invention. The computing system 102 may be used by a third party developer to develop loosely-coupled triggers associated with a multi-tenant database environment. For example, the multi-tenant database environment may be associated with the services provided by Salesforce.com®. The computing system 102 may also be used to specify custom metadata definition associated with the loosely-coupled triggers.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
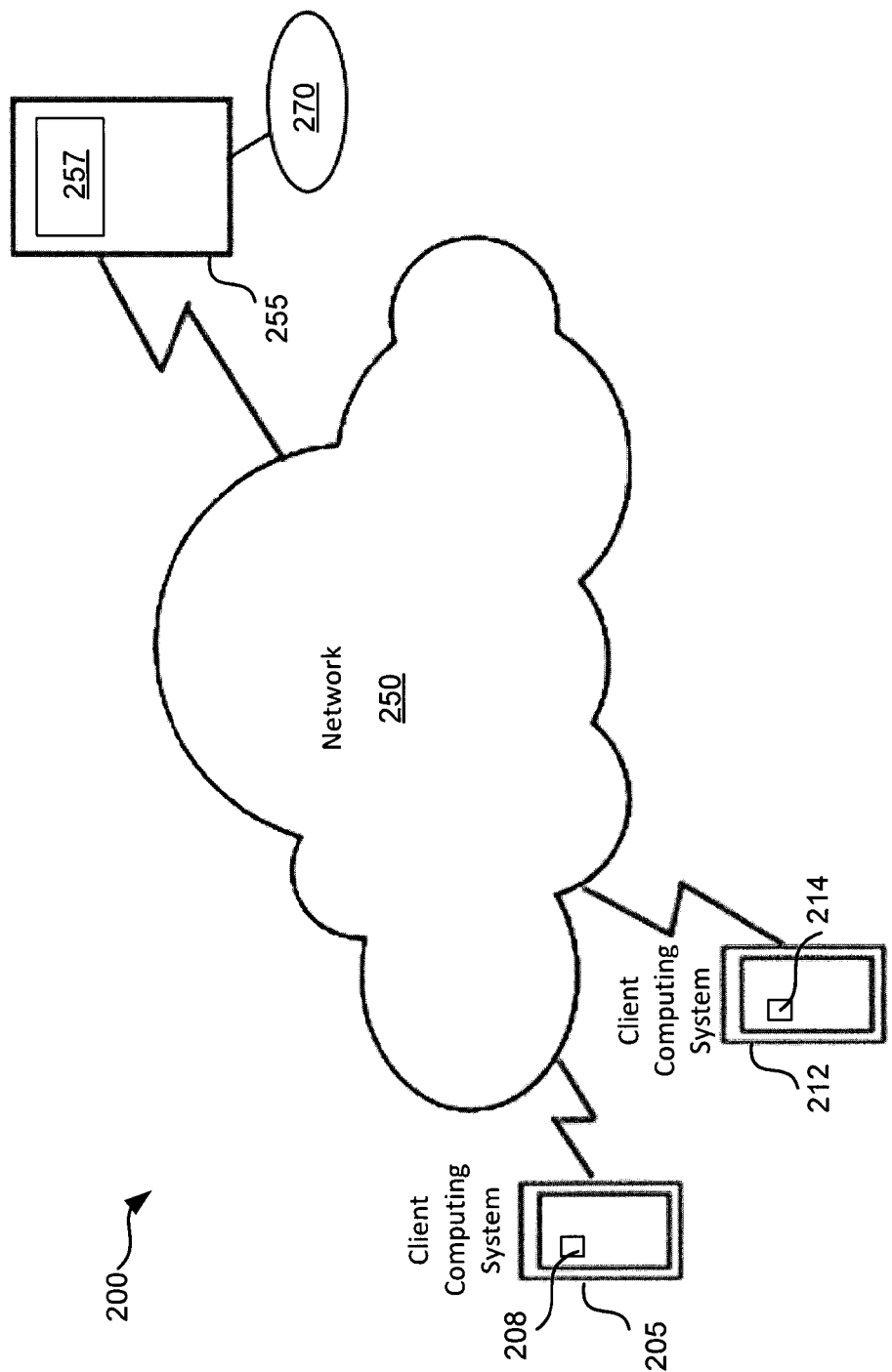
FIG. 2 shows a diagram of an example network environment that may be used, in accordance with some embodiments.

FIG. 2 shows a diagram of an example network environment that may be used with some embodiments of the present invention. Network environment 200 includes computing systems 205 and 212. One or more of the computing systems 205 and 212 may be a mobile computing system. The computing systems 205 and 212 may be connected to the network 250 via a cellular connection or via a Wi-Fi router (not shown). The network 250 may be the Internet. The computing systems 205 and 212 may be coupled with server computing system 255 via the network 250.

The computing systems 205 may include application module 208. A user may use the computing system 205 and the application module 208 to connect to and communicate with the server computing system 255 and log into application 257 (e.g., a Salesforce.com® application). The server computing system 255 may be coupled with database 270. The server computing system 255 may be associated with an entity (e.g., Salesforce.com®). The user may be associated with a third party developer. The application 257 in the server computing system 255 may generate a user interface to enable the user using the computing system 205 to provide a definition of custom metadata including at least one relationship field. The application 257 may cause a user interface to be display so the user can view and edit a loosely-coupled trigger associated with the definition of the custom metadata.

Figure 3:
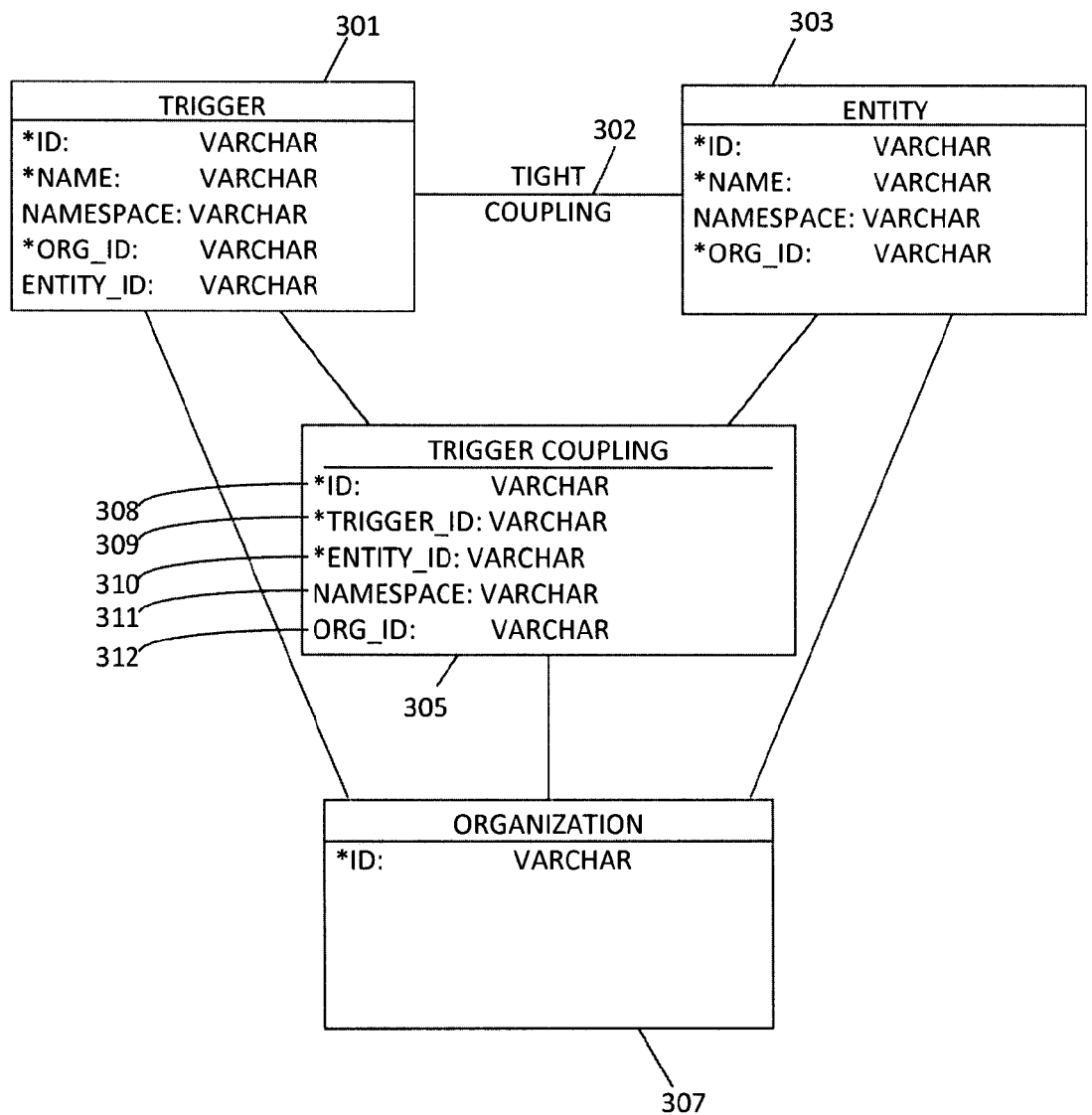
FIG. 3 shows an example database subsystem, in accordance with some embodiments.

FIG. 3 shows an example of the differences between a "tight coupling" and a "loose coupling". Trigger 301 can be tightly-coupled or loosely-coupled to the entity 303. The trigger 301 can include an ID, a name, a body, a namespace, an organization ID and an entity ID. When the trigger 301 is a tightly-coupled trigger, the trigger 301 is directly connected through a tight coupling connection 302 to the entity 303 which can have the same ID, name, body, namespace and organization ID. With the tight coupling, the trigger 301, tight coupling 302 and the entity 303 can be fixed and may be specified in a database program. The trigger 301, the tight coupling 302 and the entity 303 may only be altered before the database program is compiled.

Loose couplings are pure metadata objects requiring no compilation. They can be created or deleted, making new or fewer linkages, at any time in the process. This may apply to custom metadata records and when the custom metadata records are used for coupling a loosely coupled trigger with a triggerable database object. In contrast to tight coupling, a loosely-coupled trigger can include one or more loose couplings 305. As a loosely-coupled trigger, the trigger 301 may not include any express or direct coupling to any specific entity. The entity or entities coupled to the loosely-coupled triggers can be designated by the users of the API who may be administrators or business developers through a user interface. In this example, the loose coupling 305 may have some or all of the following attributes: ID 308, TRIGGER_ID 309, ENTITY_ID 310, NAMESPACE 311 and ORGANIZATION ID 312. The ID 308 is an identification specifically for the loose coupling 305. The TRIGGER_ID 309 corresponds to the trigger 301. The ENTITY_ID 310 corresponds to the entity 303 that the trigger 301 is loosely coupled to. The NAMESPACE 311 is specifically for the coupling and does not correspond to the NAMESPACE of either the entity 303 or the trigger 301. The entity 303, the trigger 301 and the loose coupling 305 can each be in a distinct namespace. For example, the entity 303 could come from a managed package, the loosely-coupled trigger 301 can come from another package and the loose coupling 305 could be created by the subscriber itself. The ORG_ID 312 corresponds to the organization. While the ORG_ID 312 may match the ORG_IDs of the entity 303 and the trigger 301, it can also be provided in an index so that the trigger couplings can be looked up quickly. Thus, the loose coupling 305 only uses the Entity_ID 310 to link it to the entity 303 and the Trigger_ID 309 to link it to the trigger 301.

When the end user wishes to alter this loosely-coupled trigger, the loose coupling 305 can be deleted to remove the entity 303, and then the user can create a new loose coupling 305 for any other available entity 303. It may also be possible to edit the Entity_ID 310 of the loose coupling 305 to remove an entity or entities 303 and/or add other available entities 303. For some embodiments, the trigger 301 can be coupled to the entity 303 by an organization connection 307. The organization 307 can be defined by the end user of the API through a user interface, and the organization 307 can be defined as an ID that matches the entity 303 which results in a loose coupling 305 between the trigger 301 and the entity 303.

As discussed, tightly-coupled triggers require the trigger 301 to be directly coupled to the entity 303 through tight or direct coupling 302. The tightly-coupled trigger may be part of a program written by the designer/developer of a database program, and this tight coupling is defined at the time the program is compiled. In contrast, a database program written with loosely-coupled triggers can include the trigger 301 but does not require a tight coupling 302 to couple the entity 303 to the trigger 301. Also, with loose coupling, the entity or entities associated with the trigger 301 may not be pre-determined when the program is compiled. Rather, the trigger 301 can be coupled, post-compilation, to any entity 303 on which it is legal to create a loosely-coupled trigger using the loose coupling 305. When the trigger 301 is used with a programming language such as Apex, the loose coupling between the trigger 301 and the entity 303 can be performed without the program Author's participation. The loose coupling 305 can be defined by a developer in a subscriber organization or by a user through a managed UI. Thus, a user can couple the trigger 301 to an entity 303 and/or change the coupling without any knowledge of the trigger programming language.

Figure 4A:
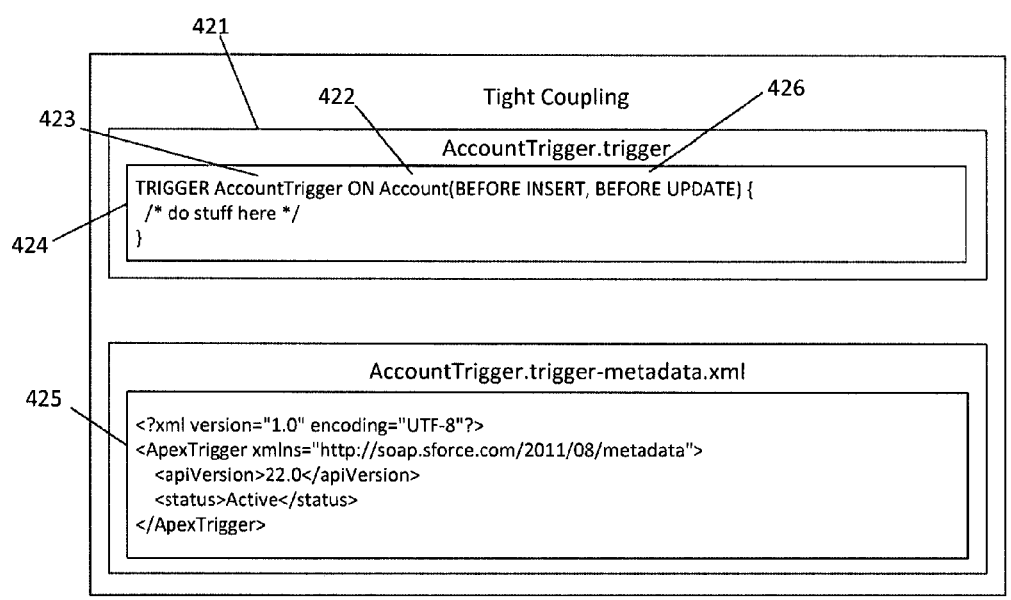
FIG. 4A illustrates a block diagram of an example of a tightly-coupled trigger and a loosely-coupled trigger, in accordance with some embodiments.

FIG. 4A shows an example of coding 424 for a tightly-coupled trigger. In this example, the trigger 421 is given a trigger name "AccountTrigger" 423. The trigger 421 is associated with an object "Account" 422. The object "Account" 422 is a triggerable database object (e.g., a database table). In this example, the trigger 421 is actuated based on the operations 426 to be performed on the object "Account" 422 such as "before data is inserted" and "before data is updated". FIG. 4A also shows an example coding for the trigger metadata 425 corresponding to the trigger 421 for tight coupling.

Figure 4B:
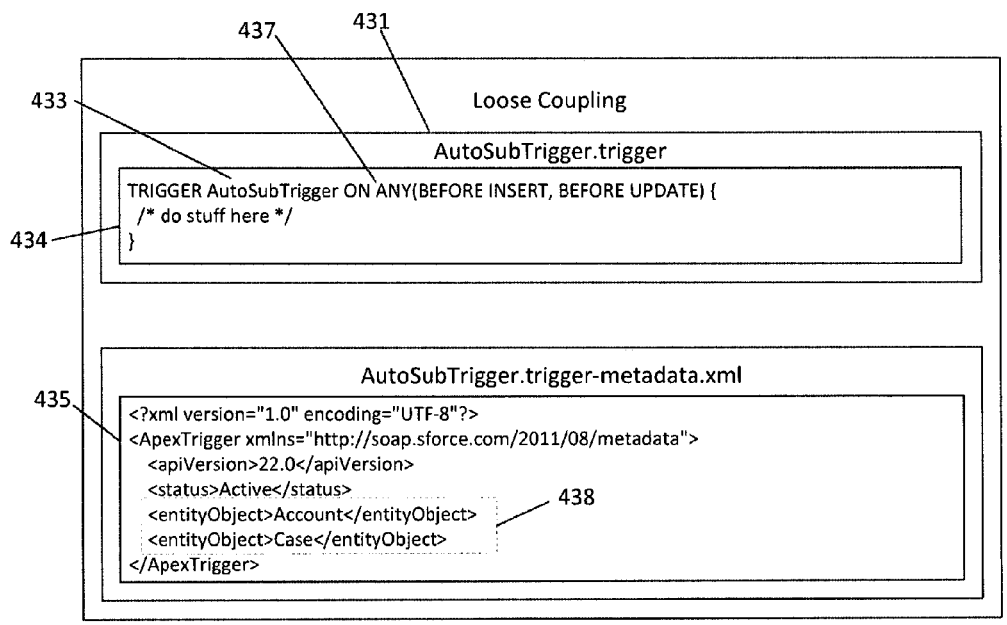
FIGS. 4B to 4E illustrate examples of coding for tightly-coupled triggers and loosely-coupled triggers, in accordance with some embodiments.

FIG. 4B shows an example of coding 434 for a loosely-coupled trigger. In this example, the trigger 431 is given a trigger name, "AutoSubTrigger" 433. The trigger 431 is defined as a loosely-coupled trigger as indicated by the term "on any" 437. In this example, the loosely-coupled trigger 431 is actuated on any loosely coupled objects selected by a database user before data is inserted or before data is updated. For some embodiments, a loose coupling can be defined using other terms or syntax. For example, the term "over CustommetadataType_RelationshipField" may be used as a substitute for "on any".

In the current example, the term "on any" 437 may be used because there is no standard object called "any" and custom objects usually have a suffix such as "_c" or "_kav." This reduces the chance of confusion between a loosely-coupled trigger and a tightly-coupled trigger. It may be possible that a system that does not provide similar limits on database object names may need to use an entirely different syntax to distinguish loosely-coupled triggers from tightly-coupled triggers. FIG. 4B also shows an example coding for the trigger metadata 435 corresponding to the trigger 431 for loose coupling.

The coding for the trigger metadata 425 for tight coupling and the coding for the trigger metadata 435 for loosely coupling may be somewhat similar. However, in this example, the coding for the trigger metadata 435 in FIG. 4B includes the code lines 438 as follows:

<entityObject>Account<entityObject>
<entityObject>Case<entityObject>

These code lines 438 in the coding for the trigger metadata 435 for loose coupling are not in the coding for the trigger metadata 425 for tight coupling. When a trigger is tightly coupled, the coupling takes place in the trigger code 424 rather than in the coding for the trigger metadata 425, as shown in FIG. 4A. The additional code lines 438 in the coding for loosely-coupled trigger metadata 435 can define the entities that can be selectively coupled to the trigger 431 by the user through a user interface. Each <entityObject> line corresponds to a selected entity defined by a user. The code lines 438 can be a representation of the data that can be selected using the loosely-coupled trigger user interface which will be described in more detail. In this example, these lines of code 438 indicate the presence of the selected entities "Account" and "Case" as being bound to the trigger 431.

Figure 4C:
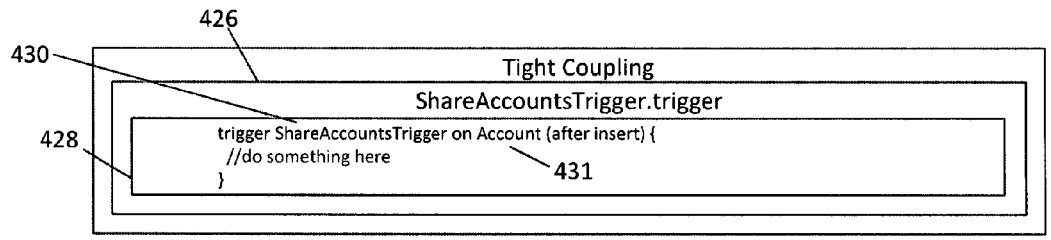

FIG. 4C illustrates an example of a tightly-coupled trigger 426 and tightly-coupled trigger coding 428. In this example, the trigger 426 is associated with the trigger file name "ShareAccountsTrigger.trigger" which contains the trigger coding 428. The trigger name "ShareAccountsTrigger" 430 which is defined in the file name "ShareAccountsTrigger-.trigger" only fires after an Account object entity 431 is inserted. If the user wishes to change the trigger's target, for example from Account 431 to Contact, the trigger portion of the program needs to be edited and recompiled. Thus, the entity Account 431 in this tightly-coupled trigger example cannot be easily changed. If a user wishes to change the coupling of the tightly-coupled trigger to multiple entities, the trigger program code must be written for each entity and the code must be recompiled.

Figure 4D:
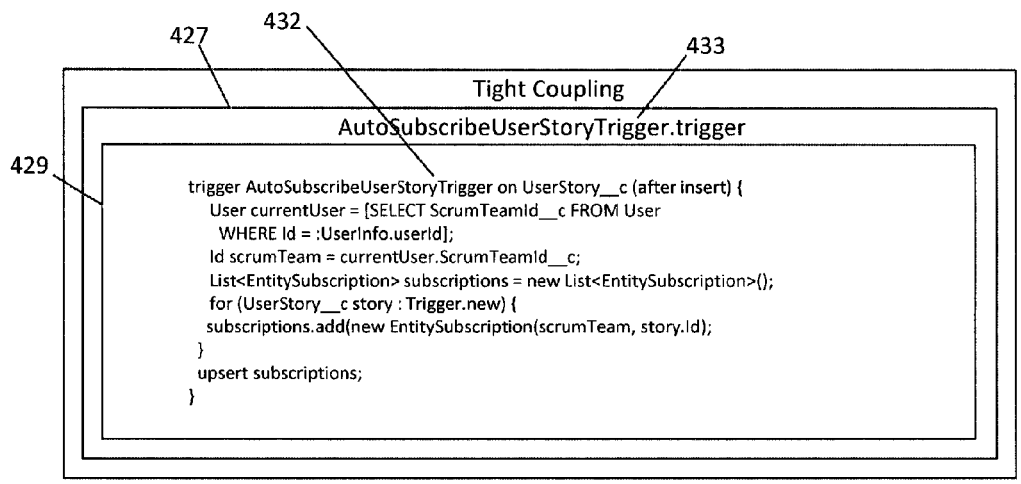

FIG. 4D illustrates another example of tight coupling. In this example, the file name "AutoSubscribeUserStoryTrigger.trigger" 433 includes trigger code for a tightly-coupled trigger that is coupled to a single entity. A trigger may be coupled to a variety of entities, such as UserStory_c, Task_c, and Sprint_c. When any of the UserStory_c, Task_c, and Sprint_c entities are inserted, the user story, task, or sprint may automatically be published to the creator's scrum team's notification application. The trigger can accomplish the publishing of the objects inserted by a user. Using tightly-coupled triggers, a developer may create three separate tightly-coupled triggers that are each like the tightly-coupled trigger 427 example of trigger code 429 for the entity, UserStory_c. Separate triggers may be created for each such entities and more trigger coding must be written with tightly-coupled triggers applied to multiple entities.

Figure 4E:
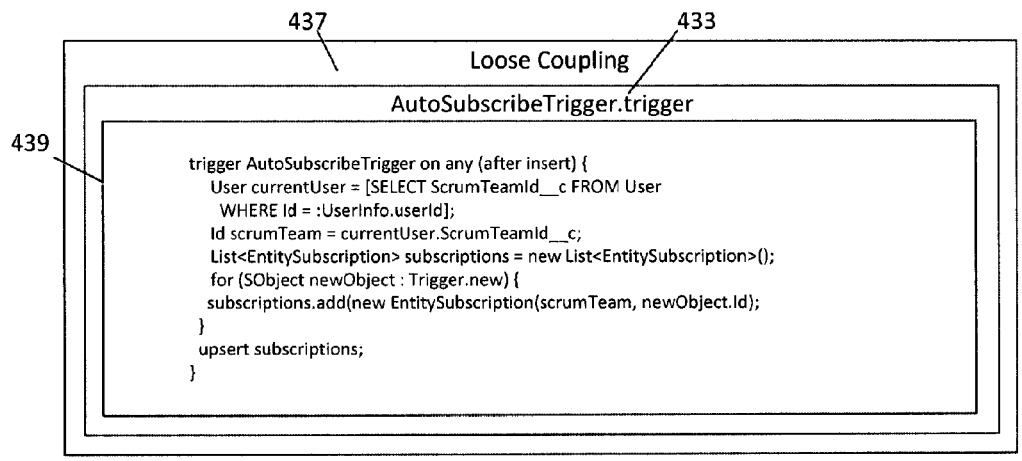

FIG. 4E illustrates an example of loose coupling. In this example, the file name "AutoSubscribeTrigger.trigger" 436 includes code 439 for the trigger 437 which can be written to perform the same trigger function as the tightly-coupled trigger shown in FIG. 4D. The trigger 437 has coding 439 that includes much of the same tightly-coupled trigger coding but can be declaratively enabled so that a selected entity or entities can be coupled to the trigger 437. The coding 439 includes the line, "trigger AutoSubscribeTrigger on any (after insert){." The term "any" can indicate that some or all of the entities to be coupled are not yet defined at the time the trigger 437 is coded. The coupled entities can be defined, added, removed or changed at any time by customers of the independent software vendor (ISV) or developer to develop the trigger through a user interface. It is also possible to define some of the trigger entities at the time the trigger 437 is coded and still allow other coupled entities to be defined by the ISV customers through the user interface. In this configuration, the trigger 437 can have both tight and loosely-coupled trigger features and may be considered a hybrid tight/loosely-coupled trigger. It is also possible for the ISV to configure the user interface control the entities that can be added, removed or changed by the ISV customer through the user interface. Thus, an ISV could package this trigger or a similar trigger, together with the custom attribute and allow the ISV's customers to use the loosely-coupled trigger to declaratively create auto-subscription rules for any number of entities that are permitted by the program.

Although most of the ISV's customers will probably not themselves be ISVs, some of them can be. In this situation, a second ISV can repackage the triggers from a first ISV with additional required couplings. These additional required couplings may be necessary for them to make the second ISV's packaged application work for their own customers. The additional required couplings may be required for the program to be fully functional with all of the second ISV's customers. The second ISV may never require fewer required couplings than the first ISV.

Figure 5A:
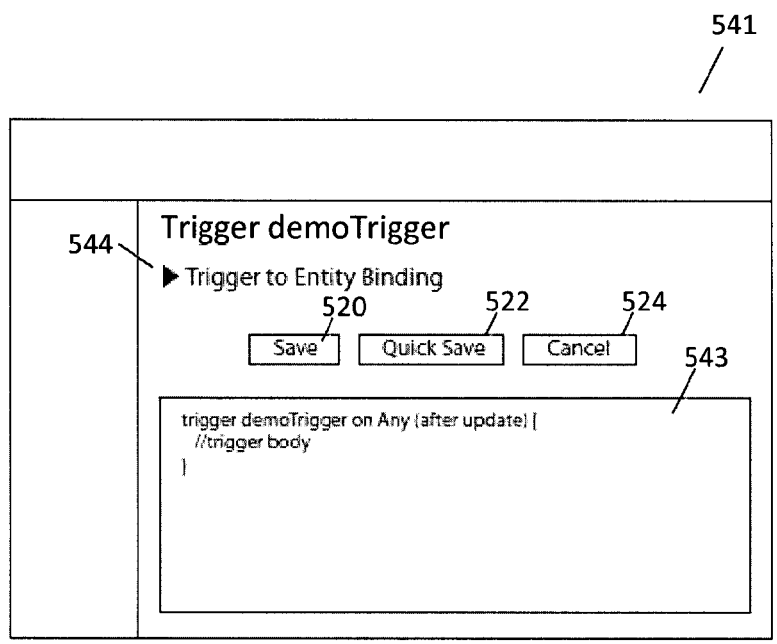
FIGS. 5A to 5C illustrate an example of a user interface for coupling entities to loosely-coupled triggers, in accordance with some embodiments.
Figure 5B:
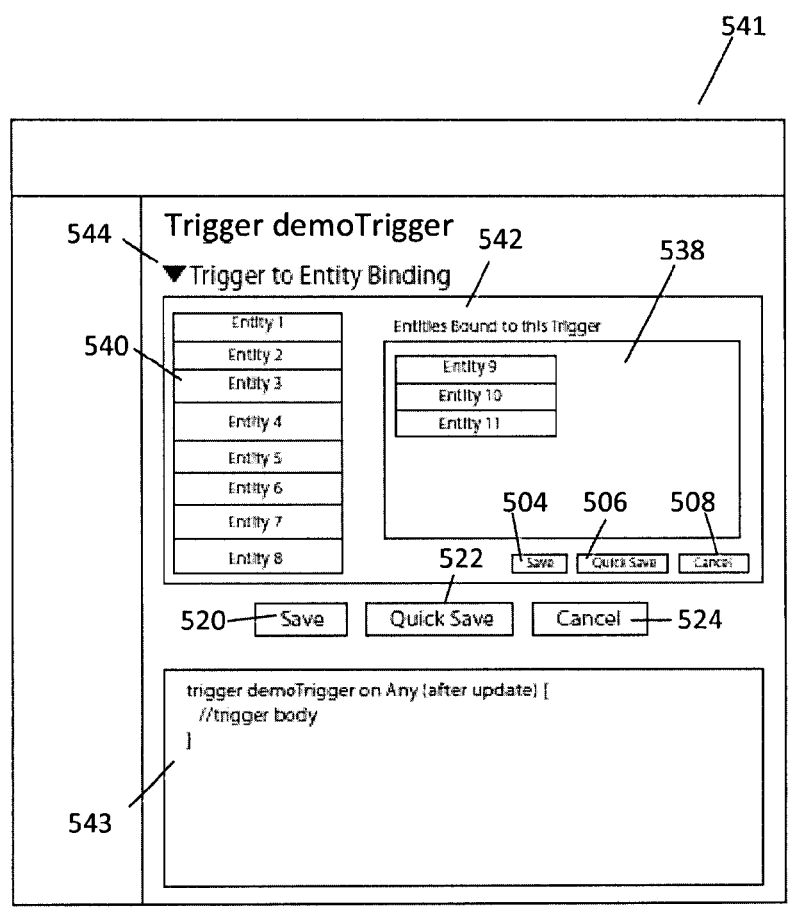

FIGS. 5A and 5B illustrate an example of a developer user interface 541 used to couple a loosely-coupled trigger to selected entities. The developer user interface 541 may also include a source code area 543 where the trigger source code can be written. In this example, the source code, "Trigger demoTrigger on Any (after update){//trigger body}" can indicate that the demoTrigger trigger is actuated after any entity that is bound to the trigger is updated. In an embodiment, the user can input the source code and after the code is complete click on a save button 520 or quick save button 522 to save the code. Alternatively, if the user does not wish to save the code, the user can click on the cancel button 524.

The developer user interface 541 can include a button 544 that expands (shown in FIG. 5B) or collapses (shown in FIG. 5A) a window 542 that may show a listing of entities 540 and a listing of entities bound to the trigger 538. In an embodiment, the user can click, drag or input the entities that are to be bound to the trigger and these entities will appear in the listing of entities bound to the trigger 538. Once the bound entities are selected, the developer can click on a save button 504 or quick save button 506 to save the loosely-coupled trigger bound entities listing. Alternatively, if the user does not wish to save the listing, the user can click on the cancel button 508. Once the developer has completed the program code, the code can be compiled and tested. After the program code has passed testing, the program with loosely-coupled triggers can be provided to subscriber users.

Figure 5C:
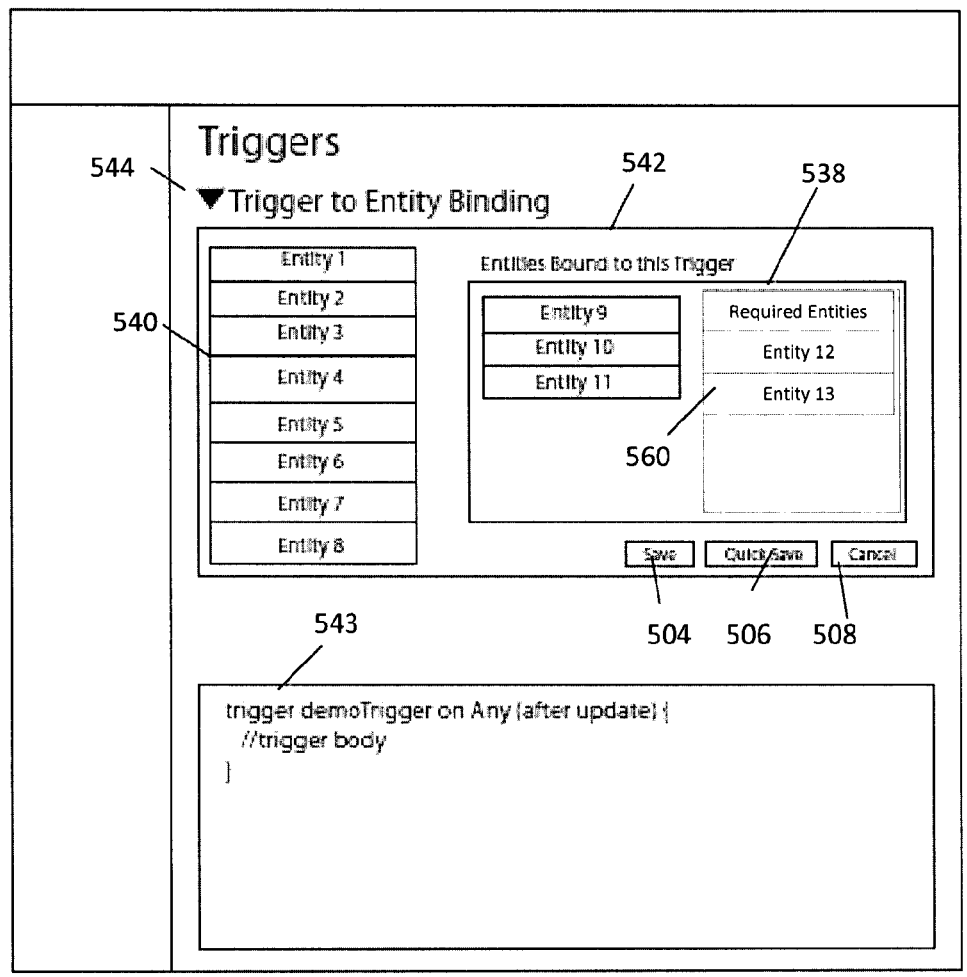

FIG. 5C shows an embodiment of a loosely-coupled trigger subscriber user interface. The subscriber user interface 550 may include a window 542 that may show a listing of entities 540 and listing of entities bound to the trigger 538. The user may be able to adjust the listing of entities bound to the trigger 538 and then save or cancel these changes using the save button 504, quick save button 506 or the cancel button 508. Some of the entities may be "required" entities that cannot be removed or decoupled from a designated loosely-coupled trigger. In an embodiment, the required entities 560 are indicated by shading or other required status designation means.

If no restrictions are in place, anyone may be able to edit the triggers at any time including the initial development, beta release and final release. However, in an embodiment, it is also possible to limit the ability of users to input source code in the source code area 543. For example, in an embodiment, the ability to edit the source code can be limited based upon the category of the user. If the user is a member of an organization developing the trigger this user may have permission to edit the trigger source code. However, if the user is only a subscriber to or a consumer of the trigger, the user may not have permission to edit the trigger source code. It is also possible to limit the ability to edit the trigger source code based upon the permission granted to a specific user by the organization. For example, if the user has permission from the organization, the user may have full access to edit the trigger source code. However, if the user does not have permission and/or the user is a member of an organization is only consuming the trigger, the user may only have read only access to the source code area 543 and no ability to edit some or all of the triggers.

In some embodiments, the subscriber user interface 550 may be able to see the source code area 543, but may not be able to edit some or all of the triggers. In other embodiments, the developer of the trigger might even be able to prevent subscribers from seeing the source code at all. In these embodiments, in which case the source code area 543 may only contain the trigger's header and possibly a placeholder text or symbol to indicate the existence of hidden source code. This concealment of the source code could be important if the trigger implementation constitutes confidential intellectual property (IP) for the developing organization. Thus, the save 520, quick save 522 and cancel 524 buttons of the developer user interface 541 shown in FIGS. 5A and 5B may not be included in the subscriber user interface 550 shown in FIG. 5C.

FIGS. 6A and 6B show an example of a database program, in accordance with some embodiments. The database program may include a trigger user interface 680 that lists some or all of the loosely-coupled triggers that are available for the user to select coupled entities. In FIG. 6A, the triggers user interface 680 includes a table that lists the names of both the tight and loosely-coupled triggers, the namespace, the version and the entity type that the loosely-coupled trigger can be bound to. In this example, a tightly-coupled trigger is named "T1" and the version being used is version 13 and is coupled to "Entity 1." The loosely-coupled trigger is named "demotrigger" the version that is being used is version 25 and is compatible with any entity type. With reference to FIG. 6B, a user can cause the trigger user interface 680 to display a bound entity window 682 that lists the entities that the each of the loosely-coupled triggers is currently coupled to. In this example, the "demotrigger" loosely-coupled trigger is bound to "Entity 12" and "Entity 13." This listing of entities can be displayed when the user actuates an entity listing command.

Loosely coupled triggers may not be executed on an entity unless they are specifically coupled to that entity. Thus, at execution time, the loosely coupled triggers may create no more performance overhead than duplicate triggers for the entities would. Loosely coupled triggers may also likely save database memory space due to less redundant code that is required by tightly-coupled triggers. Loosely coupled triggers can also reduce the number of times code must be compiled, because the loosely coupled triggers can be applied to a variety of entities without recompilation. In an embodiment, loosely coupled triggers can be compiled and, once retrieved, these loosely coupled triggers can be executed using the same mechanisms as tightly-coupled triggers. Therefore the loosely-coupled trigger features can depend heavily on existing standard trigger functionality.

Figure 6C:
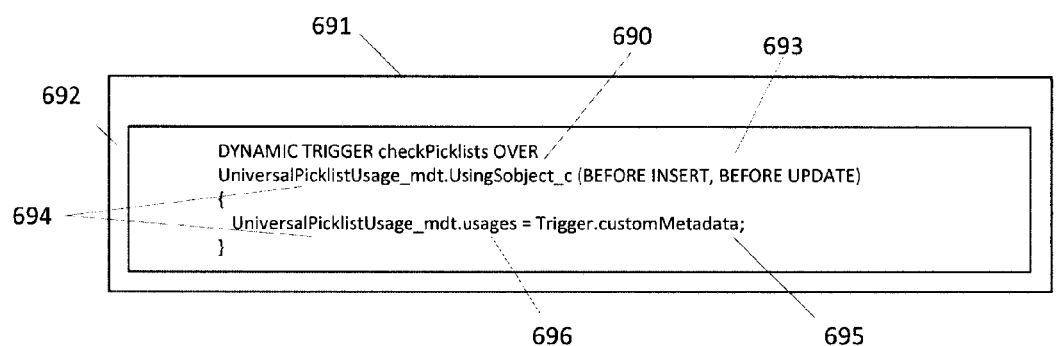
FIG. 6C illustrates a loosely coupled trigger with custom metadata, in accordance with some embodiments.

FIG. 6C shows another example of a loosely-coupled trigger with custom metadata definition, in accordance with some embodiments. In this example, the loosely-coupled trigger 691 includes trigger code 692 for the trigger named "checkPicklists". The trigger code 692 contains a custom metadata type named "UniversalPicklistusage_mdt" 694 and at least one relationship field "UsingSObject_c" 690 with a triggerable database objects as its domain. The custom metadata type "UniversalPicklistusage_mdt" 694 may be associated or attached with a triggerable database object based on the relationship field "UsingSObject_c" 690. It may be noted that the trigger code 692 does not include any information about a triggerable database object (except for the custom metadata type itself if the custom metadata type is implemented as a triggerable database object), but it contains a relationship field "UsingSObject_c" 690 that is associated, for each custom metadata record, with a triggerable database object. A detailed description of receiving a definition of a custom object specifying a custom format for metadata from a developer at a database system, where the definition of the custom object includes a relationship with at least one of a standard object defined by a platform provider of the database system that specifies a standard format for metadata is discussed in commonly owned U.S. patent application Ser. No. 13/569,113, entitled "System, method and computer program product for defining applications using metadata records created from an object specifying a predefined metadata format" filed on Aug. 7, 2012, hereby incorporated in its entirety herein for all purposes.

For some embodiments, the database system may limit the number of relationship fields in a trigger code. The loosely coupled trigger 691 can be actuated based on determining whether a triggerable database object is associated with the custom metadata type "UniversalPicklistusage_mdt" 694. The order of execution of the loosely coupled trigger 691 may be based on the operations 693 (e.g., BEFORE insert, BEFORE update) to be performed to the triggerable database object. In this example, the trigger 691 may be actuated before data is inserted or before data in the triggerable database object is updated. The "Trigger.customMetadata" 695 is the context variable supplying the injected custom metadata record. The words that are in capitals in the trigger 691 such as "DYNAMIC TRIGGER" and "OVER" are keywords for the database system to indicate that the trigger is a dynamic (or loosely-coupled) trigger.

When the database program executes, it may examine a triggerable database object that it operates on to determine if there is any custom metadata record associated with the triggerable database object. If there is an associated custom metadata record, the trigger associated with the custom metadata record executes (e.g., before data is inserted or before data is updated to the triggerable database object). If not, the trigger does not execute. For example, when the trigger 691 fires on the database object "Account", and there are two instances of custom metadata type "UniversalPicklistUsage_mdt" 694 related to the database object "Account" via the relationship field "UsingSObject_c" 690, the first line of the trigger code above may place these instances into the local variable "usages" 696, for use in the trigger code. For some embodiments, the database system can use this injection approach entirely in lieu of the trigger couplings. For example, instead of requiring an explicit specification of which triggerable database objects the trigger is fired on, the trigger can be fired on the triggerable database objects that have a non-empty list of injected metadata records.

Figure 7A:
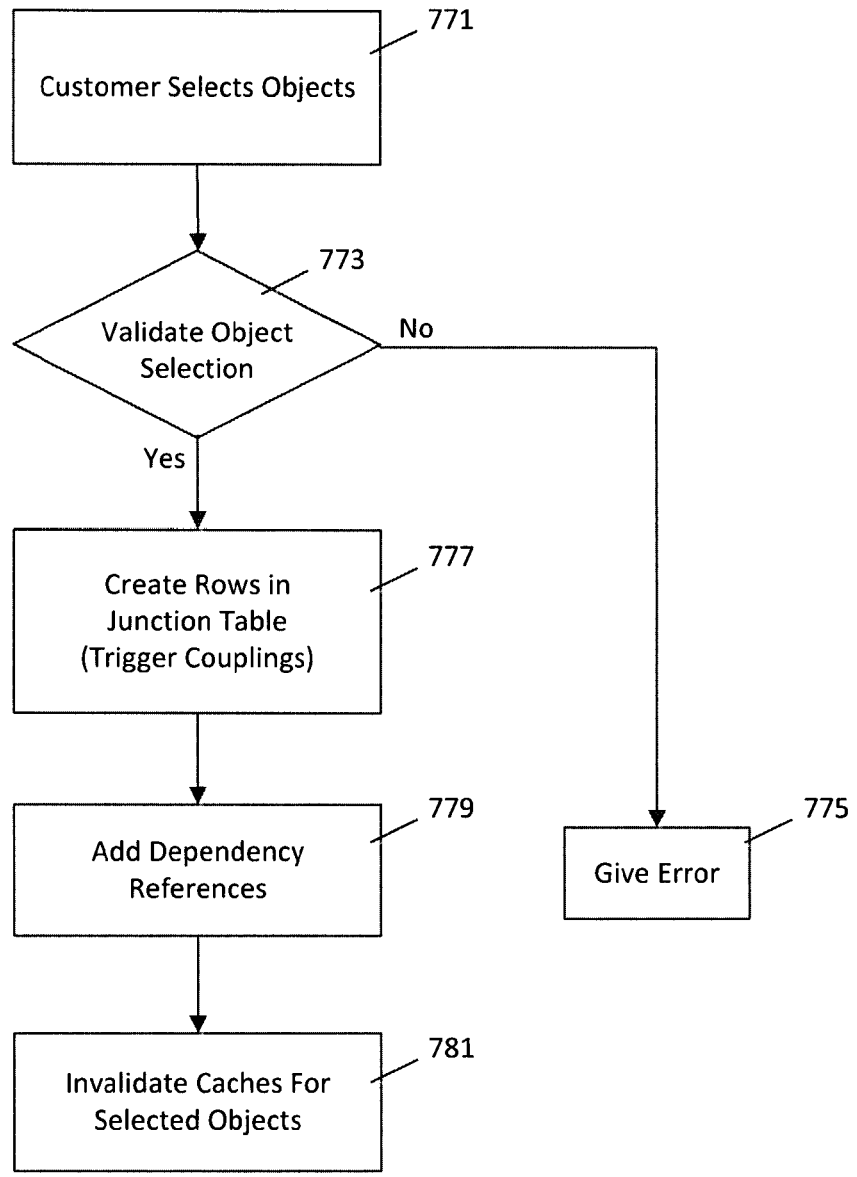
FIG. 7A illustrates a flow chart for validating entities selected by a user, in accordance with some embodiments.

For some embodiments, the database program may perform validation operations for the user selected entities. With reference to FIG. 7A, after the user selects the entities (shown at block 771), the system can attempt to validate the entity selection(s) (shown at block 773). In order to be valid, the entity must be allowed by the trigger rules. If the entity selection(s) cannot be validated, the system can give an error message (shown at block 775) and deselect the entity. There are various reasons why the entity selection cannot be validated. For example, the database provider may decide to disallow "any" triggers on certain entities that can be tightly or loosely coupled. Since those entities change often that the database provider can be concerned about system impact of specific entity selections. This is especially relevant in a multi-tenancy situation. It is also possible that the database provider may decide to limit the number loose couplings an organization are allowed to have, in total, per entity, per trigger, or in any combination of the above. This limitation can again be applied for system impact reasons, or to provide different service levels. The database provider could offer a mechanism for the trigger developers to specify their own validation rules, so that the trigger can only be applied to entities with features they specify. For example, the triggers may only be available to entities that have a field of a particular name and type.

The user can then start over by selecting a different entity (shown at block 771) to couple to the loosely-coupled trigger. If the entity selection(s) are validated the system can create rows in the junction table which are the trigger couplings (shown at block 777). The system can then add dependency references (shown at block 779) and invalidate any caches for selected entities (shown at block 781).

Figure 7B:
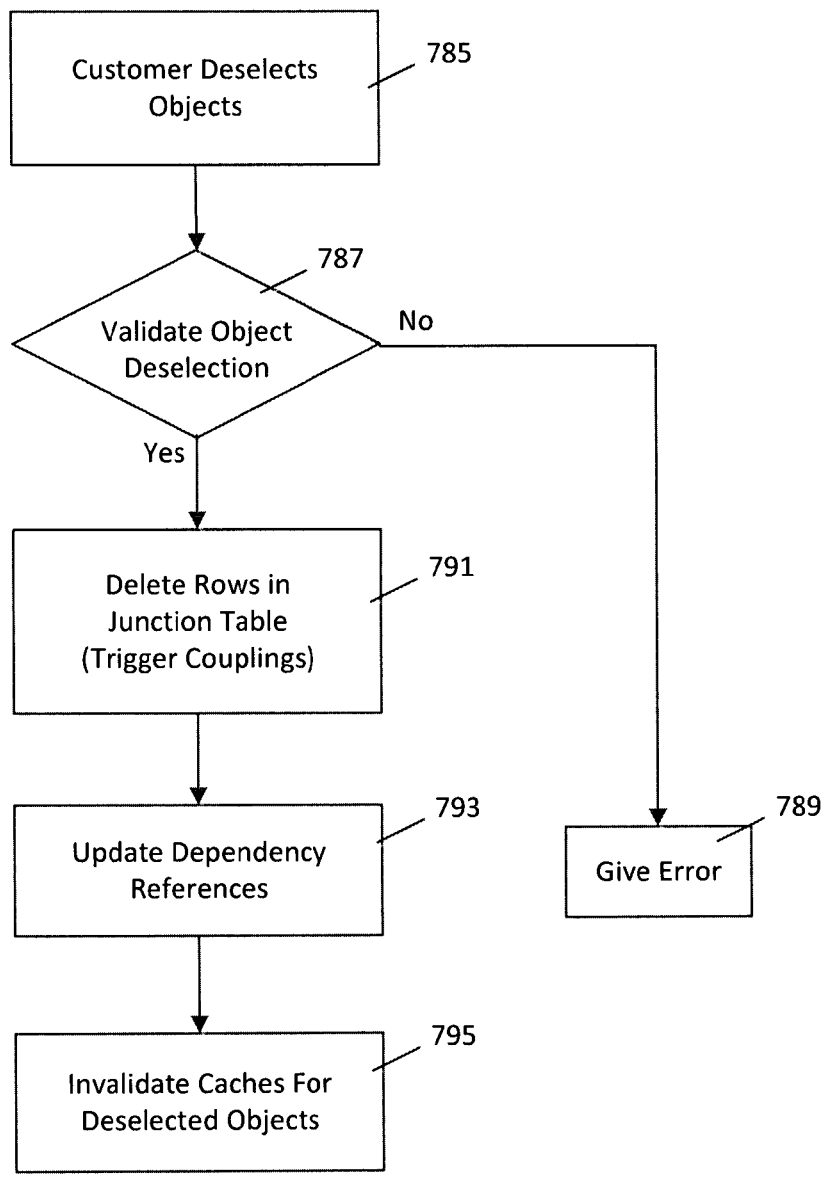
FIG. 7B illustrates a flow chart for validating entities deselected by a user, in accordance with some embodiments.

With reference to FIG. 7B, if the user deselects an entity (shown at block 785), the system can validate the entity deselection (shown at block 787). If the entity deselection is invalid based upon the trigger rules, the system can issue an error (shown at block 789) and the deselection of the entity can be stopped. For example, in some cases, the entity may be a "required entity" that cannot be deselected. If the entity deselection is validated, the system can delete the portions of the junction table which are the trigger couplings for the deselected entity (shown at block 791). For example, if the junction table is organized in rows of trigger couplings, the system can delete the row of junction table for the deselected entity (shown at block 791). The system can then update the dependency references (shown at block 793) and invalidate the caches for deselected entity (shown at block 795).

Once the desired proper loosely-coupled trigger entities have been selected, the system may validate the trigger and save the trigger definitions to a trigger metadata database which can be a "junction table." or any other similar database structure. If a loosely coupled trigger's procedural code is changed after initial save, the system may validate the trigger and save it to the trigger metadata database.

Figure 7C:
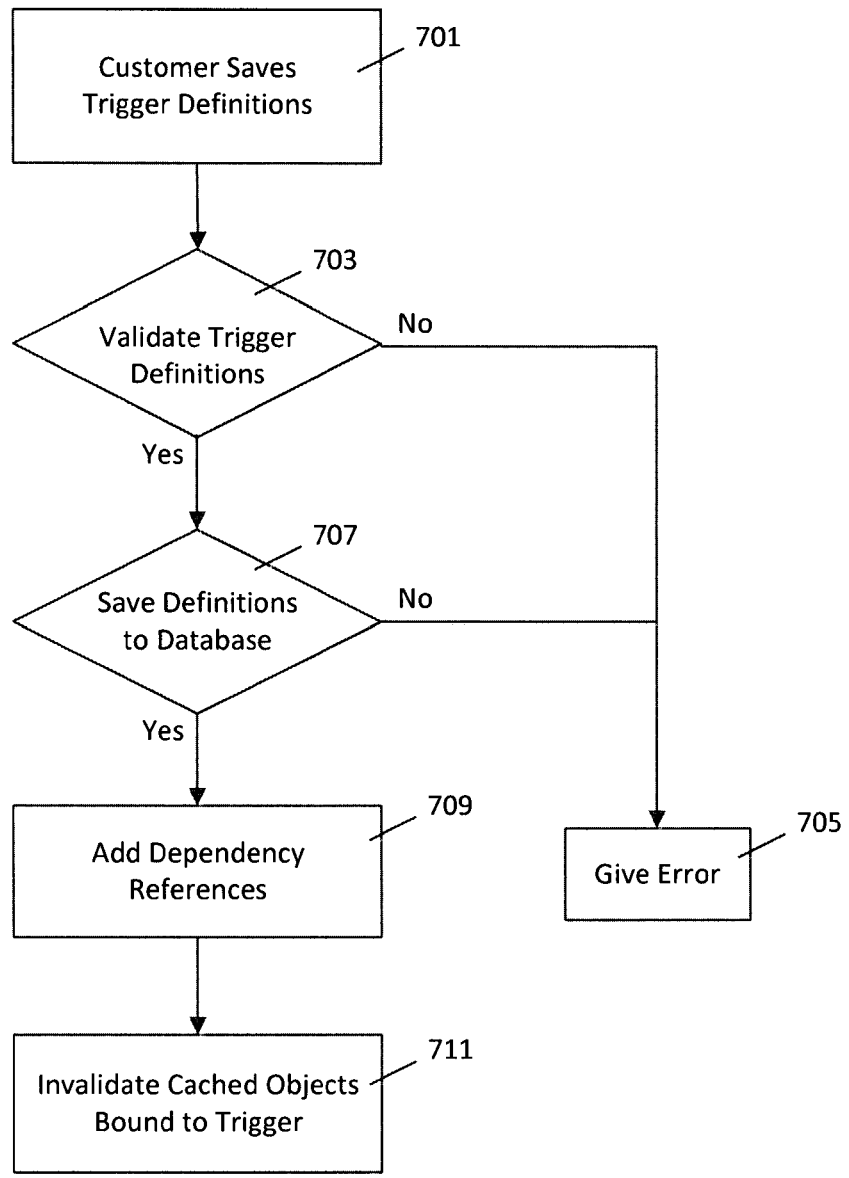
FIG. 7C illustrates a flow chart for saving trigger definitions, in accordance with some embodiments.

With reference to FIG. 7C, a system flowchart is illustrated showing the actions taken after the customer saves trigger definition (shown at block 701). The system then determines if the trigger definition is valid (shown at block 703). If the trigger definition is not valid, the system can give an error message (shown at block 705) to the customer. If the trigger definition is valid, the system can then attempt to save the trigger definition to the database (shown at block 707). If the definition cannot be saved, the system can give an error message (shown at block 705) and if the definition is saved, the system can add dependency references (shown at block 709) and then invalidate any previously cached entities bound to the trigger (shown at block 711). There are various possible reasons why a trigger definition may not be saved. For example, if the trigger contains syntax or other coding errors, such as a static reference to a nonexistent entity, that prevents compilation, the system may prevent the trigger definition from being saved. In another examples, the trigger definition may not be saved because of limits imposed by the database provider, or limitations on changes that can be made to packaged triggers once users have installed them.

Figure 7D:
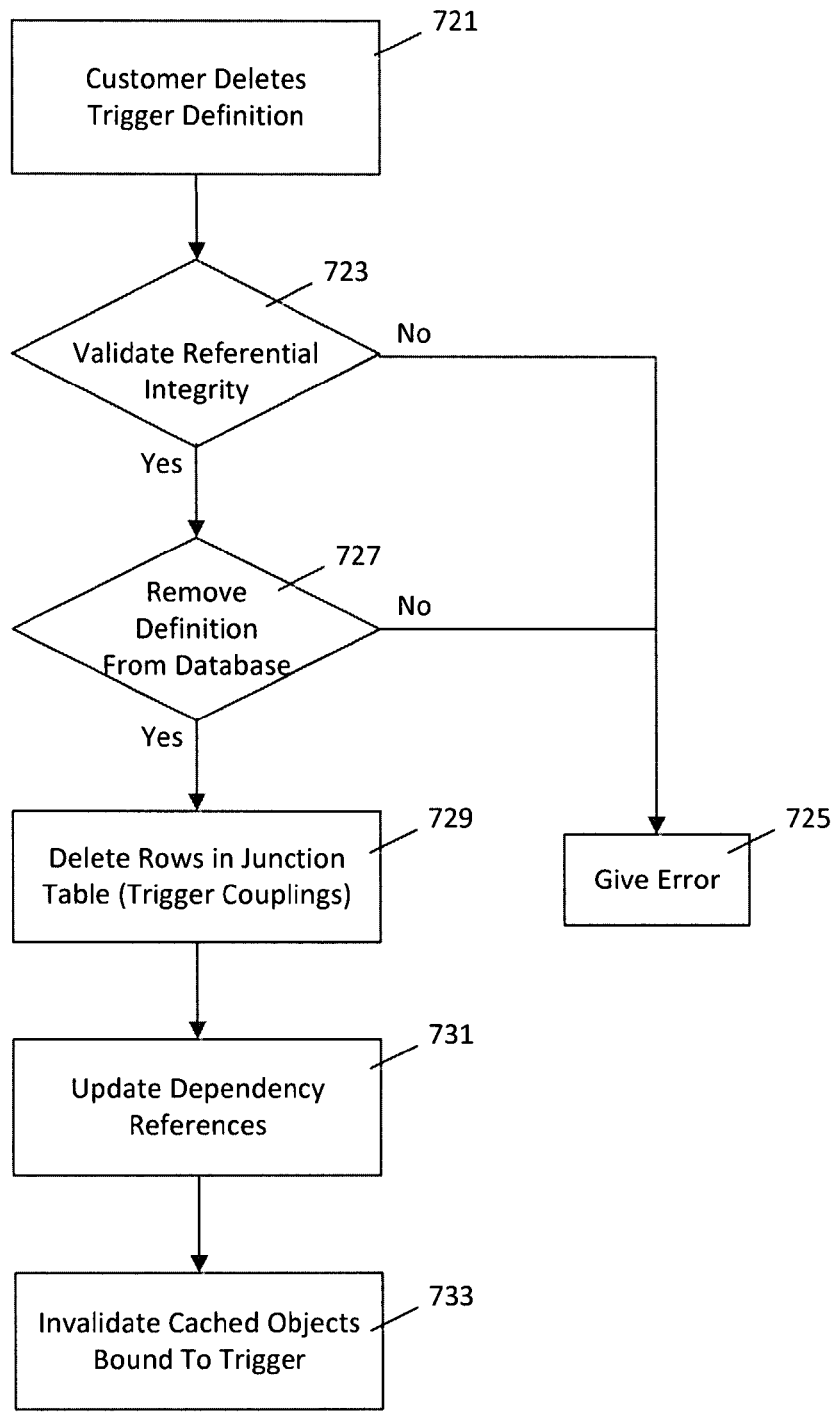
FIG. 7D illustrates a flow chart for deleting trigger definitions, in accordance with some embodiments.

With reference to FIG. 7D, a flow chart is illustrated showing the steps that the system may perform, if the user decides to delete a trigger definition (shown at block 721). The system can validate that removing the trigger will not break referential integrity (shown at block 723). If the trigger deletion cannot be validated, the system can give an error message (shown at block 725). If the trigger deletion is validated, the system can attempt to remove the trigger definition from the database (shown at block 727). The system can issue an error (shown at block 725) if the definition cannot be removed from the database. If the trigger definition is removed from the database, the system may then delete the rows in the trigger metadata database or junction table which are the trigger couplings (shown at block 729). The system can then update the dependency references (shown at block 731) to account for the trigger removal and invalidate cached entities bound to the deleted trigger (shown at block 733).

Figure 7E:
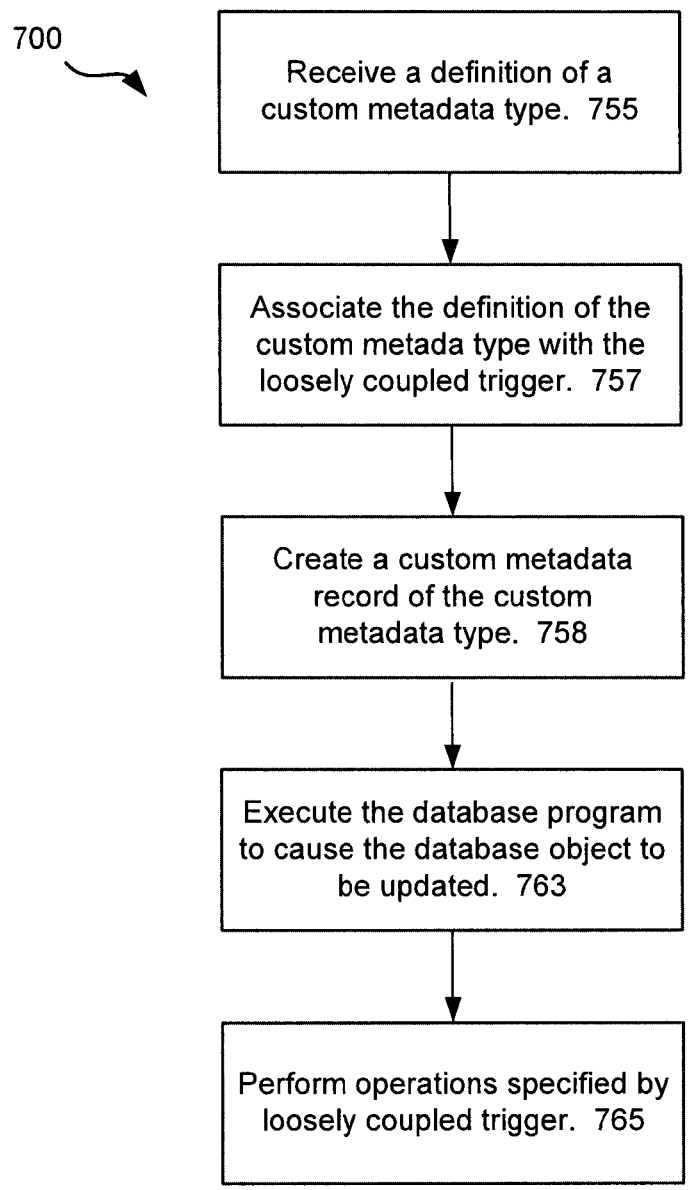
FIG. 7E illustrates a flow chart for outputting custom metadata using loosely coupled triggers, in accordance with some embodiments.

FIG. 7E shows an example flow diagram describing a process to generate a custom metadata associated with a loosely-coupled trigger, in accordance with some embodiments. For some embodiments, the definition of the custom metadata may specify the format of the custom metadata which may include fields to be included in the custom metadata. The definition may include information about values for the fields. For some embodiments, the definition of the custom metadata is related to structural metadata instead of descriptive metadata. The structural metadata is metadata about the design and specification of data structures. For some embodiments, the definition of the custom metadata are provided by third party developers for metadata others than the metadata provided by the database system. The definition of the custom metadata may include a relationship with a database object defined by the platform provider of the database system.

The process of FIG. 7E may start at block 755 where a definition of a custom metadata type is received. The definition may be received at the database system from a third-party developer using the database system (e.g. to develop applications). The definition of the custom metadata type may also be received from a platform developer that is a user of the database system. The platform developer may use the database system to define the custom metadata type. Such platform developer may therefore provide a definition of the custom metadata type so that it can be created when the trigger fires. The definition of the custom metadata type may be saved in the database system. The definition of the custom metadata type may be associated with custom metadata records that are metadata themselves. The custom metadata records may include fields of metadata types (e.g., type "AccountSetting" represents an organization's account settings for account teams, account owner report, type "AddressSettings" represents the configuration of country and state picklists). The definition of the custom metadata type may comprise at least a relationship field with triggerable database object types as the domain of the relationship field. The definition of the custom metadata type is linked to a loosely coupled trigger, as shown in block 757. For some embodiments, the connection between the custom metadata type and the loosely coupled trigger may occur before the loosely coupled trigger is compiled. At block 758, a custom metadata record of the custom metadata type is created. The custom metadata record may include a relationship field which has a value of a particular triggerable database object (e.g., account object). The custom metadata record can be created after the loosely coupled trigger is compiled. The creation of the custom metadata record causes the loosely coupled trigger to couple to the triggerable database object indicated in the relationship field.

At block 763, the database program can be caused to perform operations (e.g., update, insert, etc.) on the triggerable database object. The database program may examine the triggerable database object and determine if there is any custom metadata record associated with the triggerable database object. If there is, then the database program finds the trigger associated with the custom metadata record and fire the trigger. If there is no trigger associated with the custom metadata record, no trigger is fired. The trigger may be fired before operations to update the database object (e.g., before insert) or after the update operations (e.g., after insert). When the trigger fires, related database operations may be performed (shown at block 765). The custom metadata record includes information about the triggerable database object that the trigger fires on. The custom metadata record may be stored in the database system and may be available for access by the developers (e.g. third party developer or platform developer).

Figure 8A:
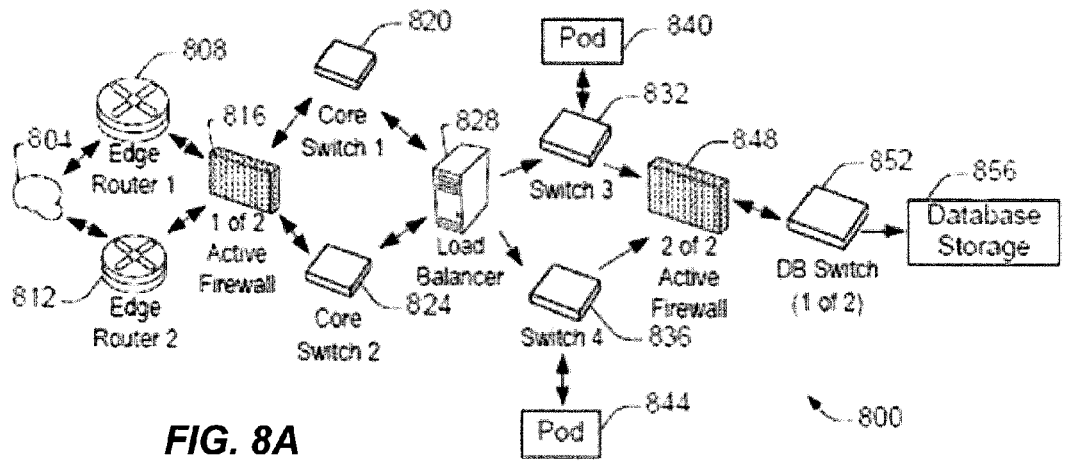
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
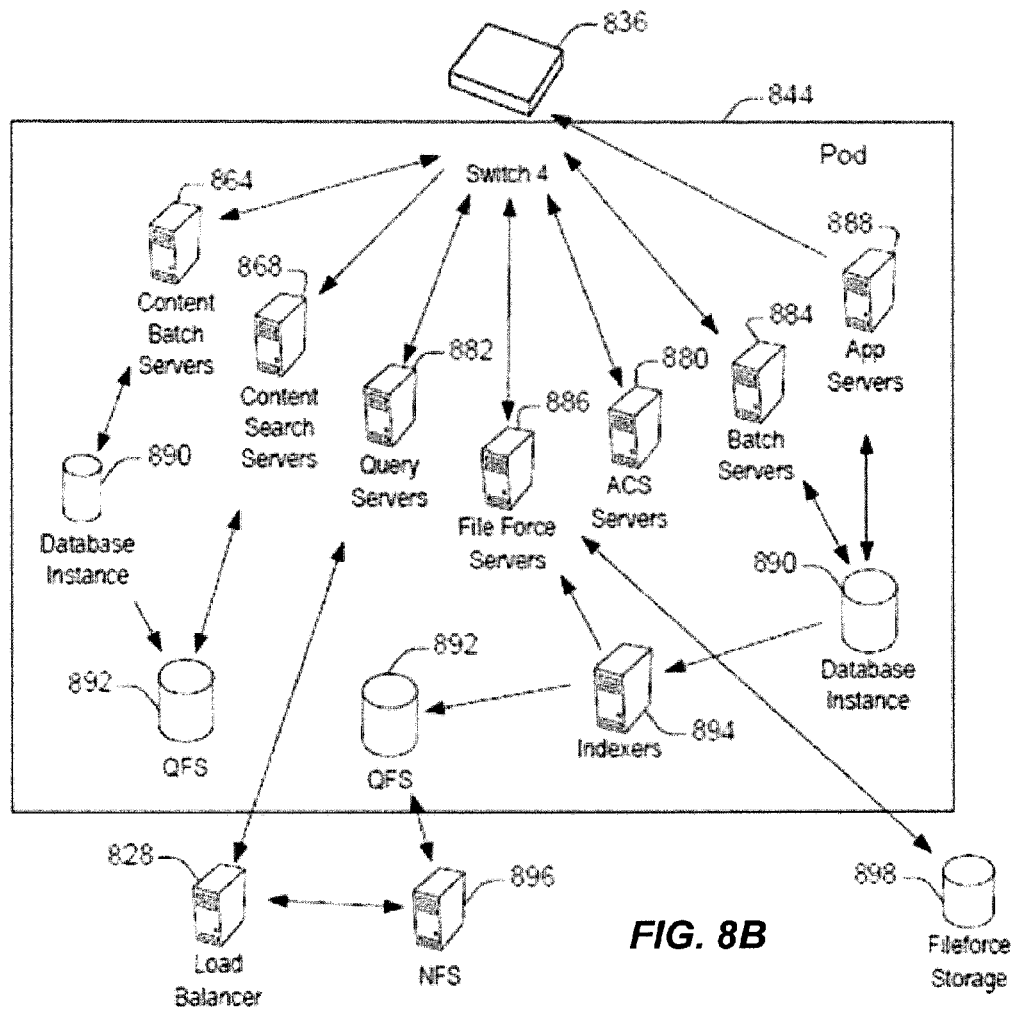
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
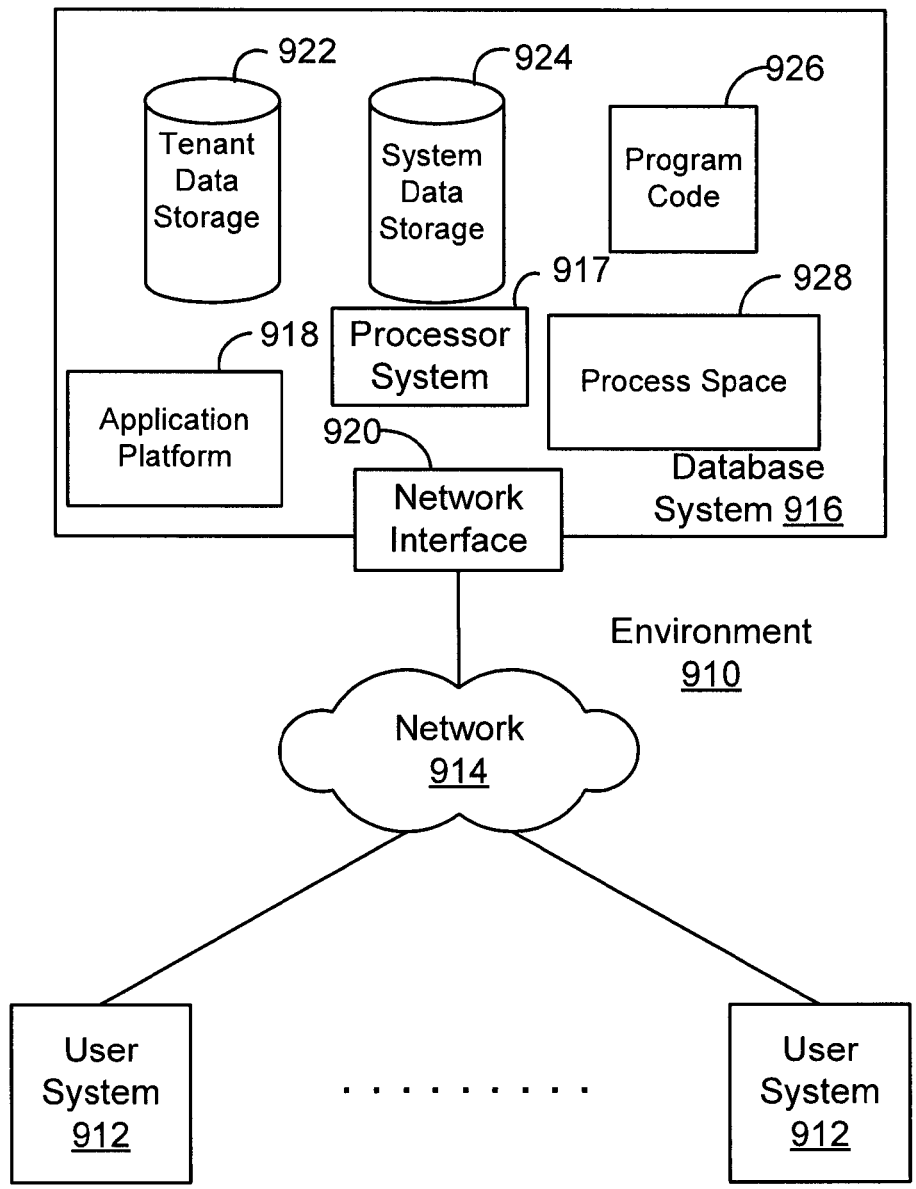
FIG. 9 shows a system diagram illustrating the architecture of a multi-tenant database environment, in accordance with some embodiments.
Figure 10:
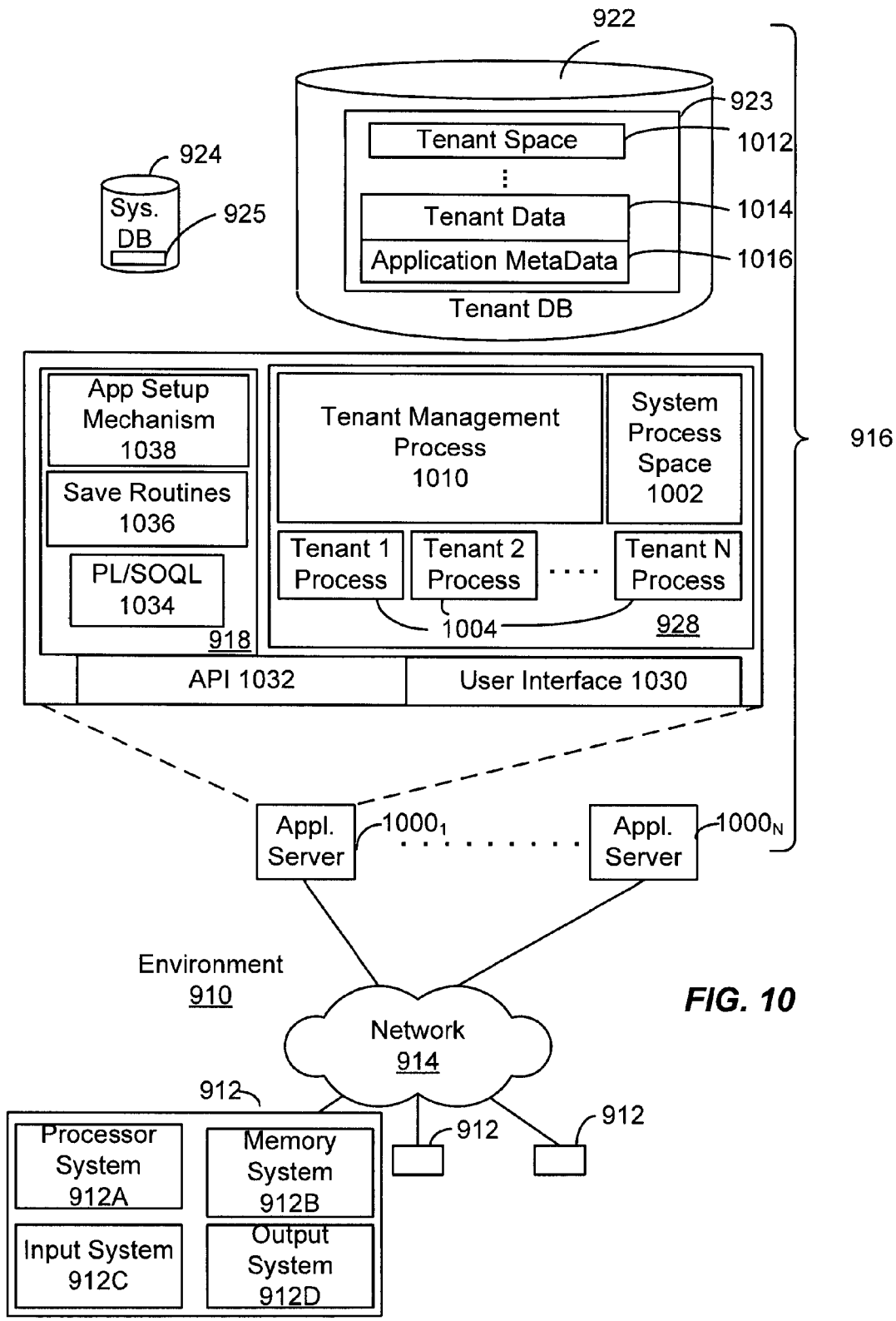
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

The invention claimed is:

1. A method for using a custom metadata type with loosely coupled triggers, the method comprising:
   receiving, by a database system, a definition of custom metadata type, the definition comprising at least one relationship field associated with a triggerable database object;
   associating, by the database system, the definition of the custom metadata type with a loosely-coupled trigger; and
   causing, by the database system, the loosely-coupled trigger to execute based on generating a custom metadata record of the custom metadata type, the custom metadata record being generated after the loosely-coupled trigger is compiled and including a triggerable database object value for the relationship field.

2. The method of claim 1, wherein said associating the definition of the custom metadata type with a loosely-coupled trigger occurs before the loosely coupled trigger is compiled.

3. The method of claim 2, wherein the custom metadata record is generated after the loosely coupled trigger has been compiled.

4. The method of claim 3, wherein the generation of the custom metadata record causes the loosely coupled trigger to associate with the triggerable database object indicated by the triggerable database object value of the relationship field.

5. The method of claim 4, wherein the loosely coupled trigger is caused to execute based on an update to the triggerable database object identified in the triggerable database object value.

6. The method of claim 5, further comprising:
determining, by the database system, whether the triggerable database object is associated with the custom metadata record, and if so, identifying the loosely coupled trigger associated with the custom metadata record.

7. The method of claim 6, wherein the update to the triggerable database object comprises one of creating a record, modifying a record, and deleting a record.

8. The method of claim 1, wherein the definition of the custom metadata type is provided by a developer, and wherein the custom metadata record is stored by the database system.

9. An apparatus for custom metadata with loosely coupled triggers, the apparatus comprising:
one or more processors; and
a non-transitory computer readable medium storing a plurality of instructions, which when executed, cause the one or more processors to:
receive, by a database system, a definition of custom metadata type, the definition comprising at least one relationship field associated with a triggerable database object;
associate, by the database system, the definition of the custom metadata type with a loosely-coupled trigger; and
cause, by the database system, the loosely-coupled trigger to execute based on generating a custom metadata record of the custom metadata type, the custom metadata record being generated after the loosely-coupled trigger is compiled and including a triggerable database object value for the relationship field.

10. The apparatus of claim 9, wherein the definition of the custom metadata type is associated with a loosely-coupled trigger before the loosely coupled trigger is compiled.

11. The apparatus of claim 10, wherein the custom metadata record is generated after the loosely coupled trigger has been compiled.

12. The apparatus of claim 11, wherein the generation of the custom metadata record causes the loosely coupled trigger to associate with the triggerable database object indicated by the triggerable database object value of the relationship field.

13. The apparatus of claim 12, wherein the loosely coupled trigger is caused to execute based on an update to the triggerable database object identified in the triggerable database object value.

14. The apparatus of claim 13, further comprising:
determine, by the database system, whether the triggerable database object is associated with the custom metadata record, and if so, identify the loosely coupled trigger associated with the custom metadata record.

15. A computer program product comprising computer-readable program code to be executed by one or more processors when retrieved from a non-transitory computer-readable medium, the program code including instructions to:
receive, by a database system, a definition of custom metadata type, the definition comprising at least one relationship field associated with a triggerable database object;
associate, by the database system, the definition of the custom metadata type with a loosely-coupled; and
cause, by the database system, the loosely-coupled trigger to execute based on generating a custom metadata record of the custom metadata type, the custom metadata record being generated after the loosely-coupled trigger is compiled and including a triggerable database object value for the relationship field.

16. The computer program product of claim 15, wherein the definition of the custom metadata type is associated with a loosely-coupled trigger before the loosely coupled trigger is compiled.

17. The computer program product of claim 16, wherein the custom metadata record is generated after the loosely coupled trigger has been compiled.

18. The computer program product of claim 17, wherein the generation of the custom metadata record causes the loosely coupled trigger to associate with the triggerable database object indicated by the triggerable database object value of the relationship field.

19. The computer program product of claim 18, wherein the loosely coupled trigger is caused to execute based on an update to the triggerable database object identified in the triggerable database object value.

20. The computer program product of claim 19, wherein the program code includes further instructions to:
determine, by the database system, whether the triggerable database object is associated with the custom metadata record, and if so, identify the loosely coupled trigger associated with the custom metadata record.

* * * * *